United States Patent
Pencak et al.

(10) Patent No.: US 8,469,442 B1
(45) Date of Patent: Jun. 25, 2013

(54) VEHICLE FRONT BODY STRUCTURE

(75) Inventors: Jeff Pencak, Howell, MI (US); Brian C. Shepard, Ypsilanti, MI (US); Scott Nydam, Farmington Hills, MI (US); Jonathan Zischke, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 13/535,044

(22) Filed: Jun. 27, 2012

(51) Int. Cl.
*B60N 99/00* (2006.01)

(52) U.S. Cl.
USPC ...................................... 296/187.12; 296/198

(58) Field of Classification Search
USPC .................. 296/187.09, 187.12, 193.09, 198, 296/203.02, 203.03, 29, 30; 280/784, 770
See application file for complete search history.

(56) References Cited

U.S. PATENT DOCUMENTS

| | | | |
|---|---|---|---|
| 3,881,742 A | 5/1975 | Felzer | |
| 5,011,201 A | 4/1991 | Takahashi et al. | |
| 5,275,436 A | 1/1994 | Pomero | |
| 5,348,113 A | 9/1994 | Drvota et al. | |
| 6,286,867 B1 | 9/2001 | Braemig et al. | |
| 6,364,358 B1 | 4/2002 | Miller | |
| 6,631,942 B1 | 10/2003 | Kitagawa | |
| 6,698,823 B2 * | 3/2004 | Kim | 296/203.03 |
| 6,705,670 B2 | 3/2004 | Forssell et al. | |
| 6,866,115 B2 | 3/2005 | Miyasaka | |
| 6,938,950 B2 | 9/2005 | Nagafuchi et al. | |
| 2012/0043785 A1 | 2/2012 | Mildner | |

* cited by examiner

*Primary Examiner* — Lori Lyjak
(74) *Attorney, Agent, or Firm* — Global IP Counselors, LLP (57) ABSTRACT

A vehicle front body structure includes an A-pillar support portion, a dash wall, a front structural support portion, a lateral structural support portion and a reinforcing bracket. The dash wall is attached to the A-pillar support portion and at least partially defines a wheel well. The front structural support portion extends in a vehicle longitudinal direction from the dash wall. The lateral structural support portion extends from the front structural support to the A-pillar support portion along a lower portion of the dash wall. The reinforcing bracket is attached at a first location to the A-pillar support portion, attached at a second location to the lateral structural support portion, attached at a third location to the front structural support portion and attached at a fourth location to the dash wall. The reinforcing bracket extends across an overlap connection between the dash wall and the A-pillar support portion.

20 Claims, 11 Drawing Sheets

FIG. 21 ously, the present invention
VEHICLE FRONT BODY STRUCTURE

BACKGROUND

1. Field of the Invention

The present invention generally relates to a vehicle front body structure. More specifically, the present invention relates to a vehicle front body structure that includes a reinforcing bracket attached to a plurality of structural elements.

2. Background Information

Vehicle body structures are regularly being redesigned to include structural elements that absorb impact force in response to head-on impact events.

SUMMARY

One object is to provide a vehicle front body structure with a reinforcing bracket that distributes off-center frontal impacting forces to a plurality of structural members of the vehicle front body structure.

In view of the state of the known technology, one aspect of the present disclosure provides a vehicle front body structure that includes an A-pillar support portion, a dash wall, a front structural support portion, a lateral structural support portion and a reinforcing bracket. The dash wall is attached to the A-pillar support portion and at least partially defines a wheel well. The front structural support portion extends in a vehicle longitudinal direction from the dash wall. The lateral structural support portion extends from the front structural support to the A-pillar support portion along a lower portion of the dash wall. The reinforcing bracket is attached at a first location to the A-pillar support portion, attached at a second location to the lateral structural support portion, attached at a third location to the front structural support portion and attached at a fourth location to the dash wall. The reinforcing bracket extends across an overlap connection between the dash wall and the A-pillar support portion.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
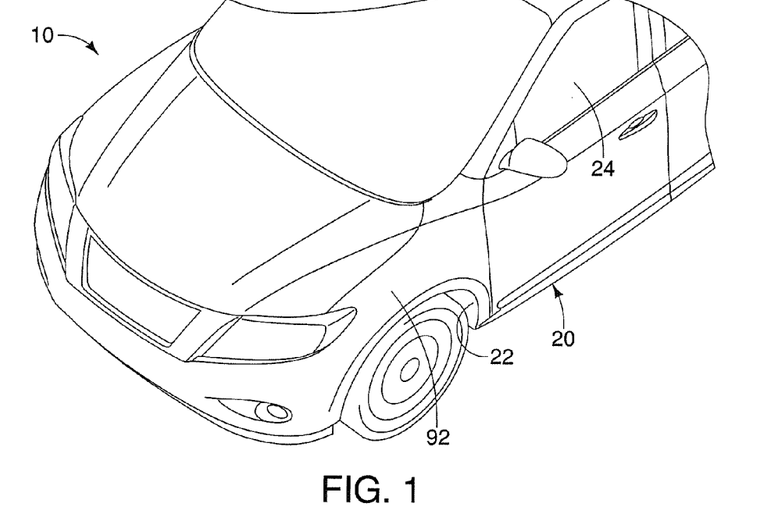
FIG. 1 is a perspective view of a vehicle showing a front portion of a vehicle body structure including a front wheel well in accordance with one embodiment.

Referring initially to FIG. 1, a vehicle 10 is illustrated in accordance with a first embodiment that includes an outer reinforcing bracket 12 (FIGS. 4, 5 and 8-11) and an inner reinforcing bracket 14 (FIGS. 2-4 and 14-21). The outer reinforcing bracket 12 and the inner reinforcing bracket 14 are described in greater detail below after a description of related portions of the vehicle 10.

As shown in FIGS. 1-6, the vehicle 10 basically includes a vehicle body structure 20. The vehicle 10 includes other features whose description is omitted for the sake of brevity. The vehicle body structure 20 defines a wheel well 22 and a passenger compartment 24 that are related to the outer reinforcing bracket 12 and the inner reinforcing bracket 14. Specifically, the outer reinforcing bracket 12 is installed to sections of the vehicle body structure 20 that define and/or are exposed to the wheel well 22 and the inner reinforcing bracket 14 is installed to surfaces of the vehicle body structure 20 within the passenger compartment 24, as described in greater detail below. The passenger compartment 24 is a vehicle cabin. Therefore the structures relating to the passenger compartment 24 constitute a vehicle cabin body structure.

Figure 2:
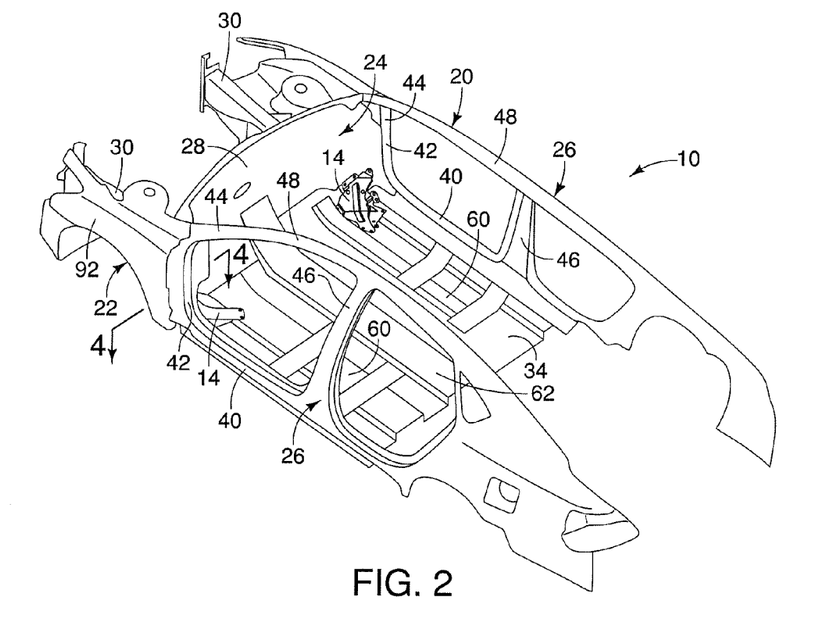
FIG. 2 is another perspective view of the vehicle showing the vehicle body structure with various components and body panels removed showing side sills, a dash wall, a passenger compartment floor and a pair of inner reinforcing brackets attached to the dash wall, the side sills and the floor panels within a passenger compartment in accordance with the one embodiment.
Figure 3:
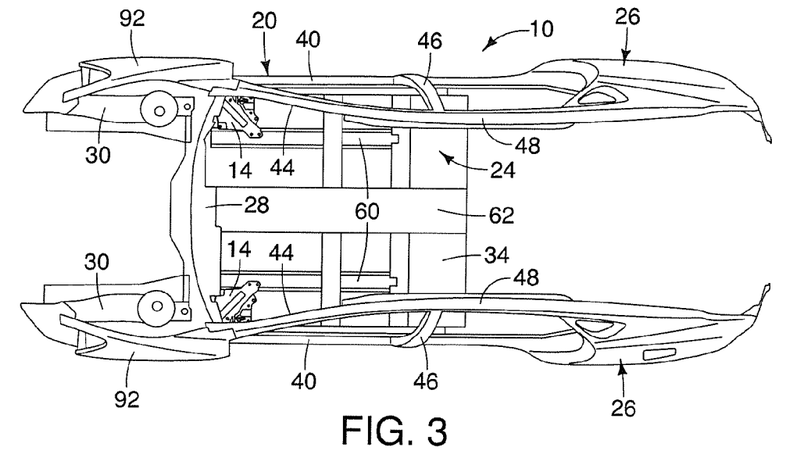
FIG. 3 is a top view of the vehicle body structure showing the pair of inner reinforcing brackets attached to the floor and dash wall in accordance with the one embodiment.
Figure 4:
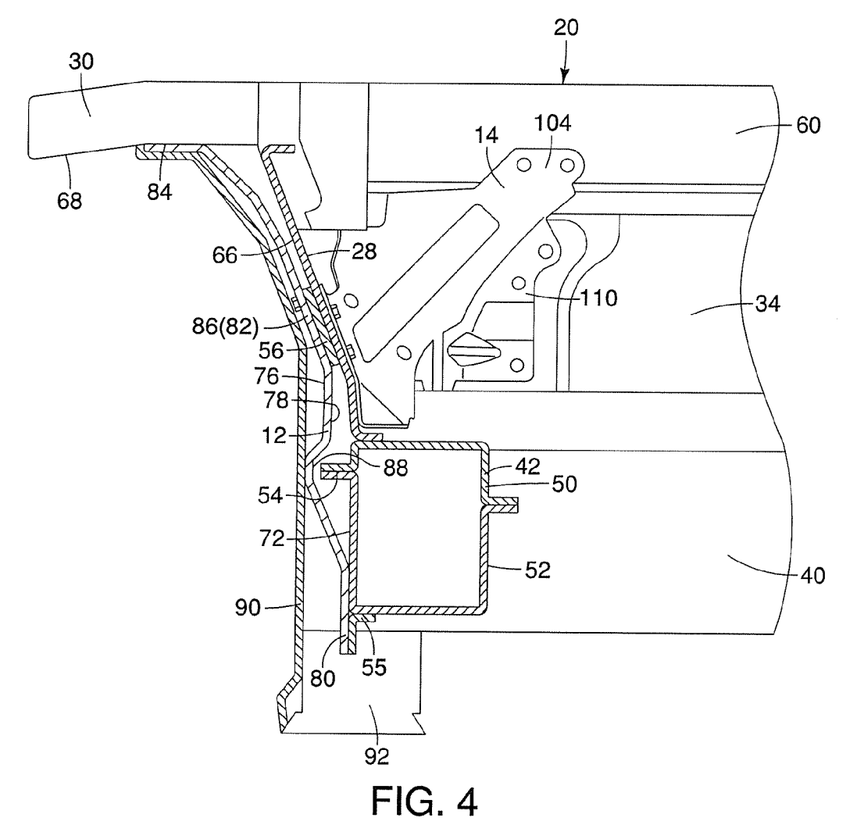
FIG. 4 is a cross-section of a section of the vehicle body structure taken along the line 4-4 in FIG. 2, showing an A-pillar support portion of the side sill, the dash wall, and a front structural support in accordance with the one embodiment.

As best shown in FIGS. 2 and 3, the vehicle body structure 20 basically includes side body panels 26 (FIGS. 2 and 3), a dash wall 28 (FIGS. 2 and 4-6), front structural support portions 30 (FIGS. 2-6), lateral structural support portions 32 (FIGS. 5 and 6) and a floor 34 (FIGS. 2-4). The vehicle body structure 20 depicted in the drawings is a uni-body type construction where various panels and assemblies are welded together to form a unitary, monolithic structure. However, it should be understood from the drawings and the description herein that the vehicle body structure 10 can alternatively include separate, conventional frame and body structures.

Each of the side body panels 26 includes a variety of assemblies and/or panels, welded together to form each of the side body panels 26. Since the side body panels 26 are symmetrical (mirror images of one another) but otherwise identical, description of only one side body panel 26 is provided, but applies equally to both.

The side body panel 26 includes, for example, a side sill 40, an A-pillar support portion 42, an A-pillar 44, a B-pillar 46 and a roof rail 48. It should be understood that the side body panel 26 can include other sections and/or portions whose description is omitted for the sake of brevity. It should also be understood that the A-pillar support portion 42 can be part of the side sill 40. The A-pillar support portion 42 extends from the side sill 40 upward until it either connects to and/or transitions into the A-pillar 44 and the roof rail 48.

As shown in FIG. 4, the A-pillar support portion 42 includes an inner panel 50 and an outer panel 52. Alternatively, the inner panel 50 can be an extending portion or attachment to the dash wall 28. The inner and outer panels 50 and 52 are welded together such that a seam 54 is defined at the union of the inner and outer panels 50 and 52. The seam 54 extends forward from front surfaces of each of the inner and outer panels 50 and 52. The seam 54 is basically an overlap section between the inner and outer panels 50 and 52. The A-pillar support portion 42 is provided with a fender attachment bracket 55, as is explained in greater detail below.

Figure 5:
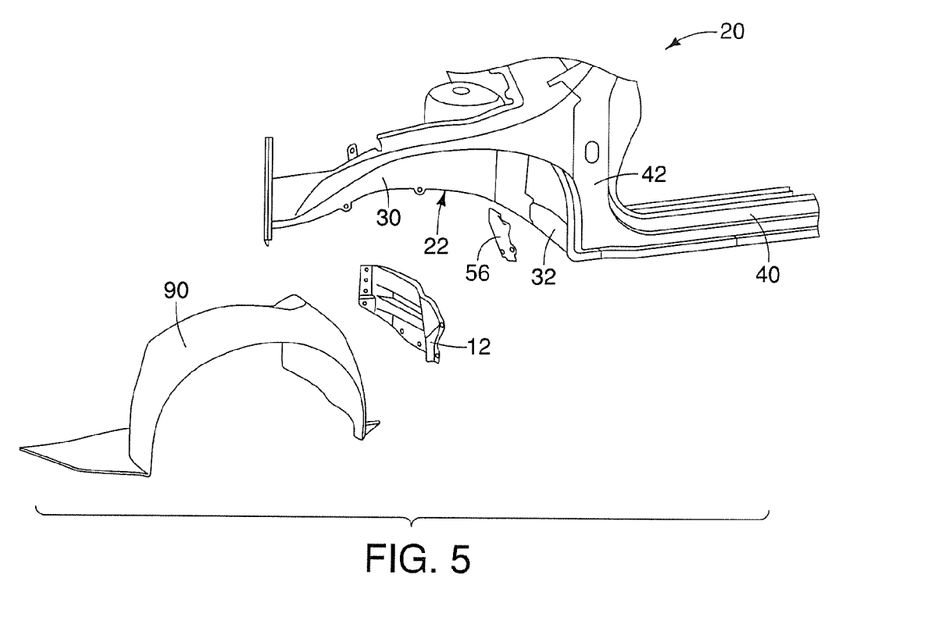
FIG. 5 is an exploded perspective view of the front portion of the vehicle body structure showing elements that at least partially define the wheel well, including the A-pillar support portion of the side sill, the dash wall, a lateral support structure and a front structural support portion, along with an offset bracket, a reinforcing bracket and wheel well cover in accordance with the one embodiment.
Figure 6:
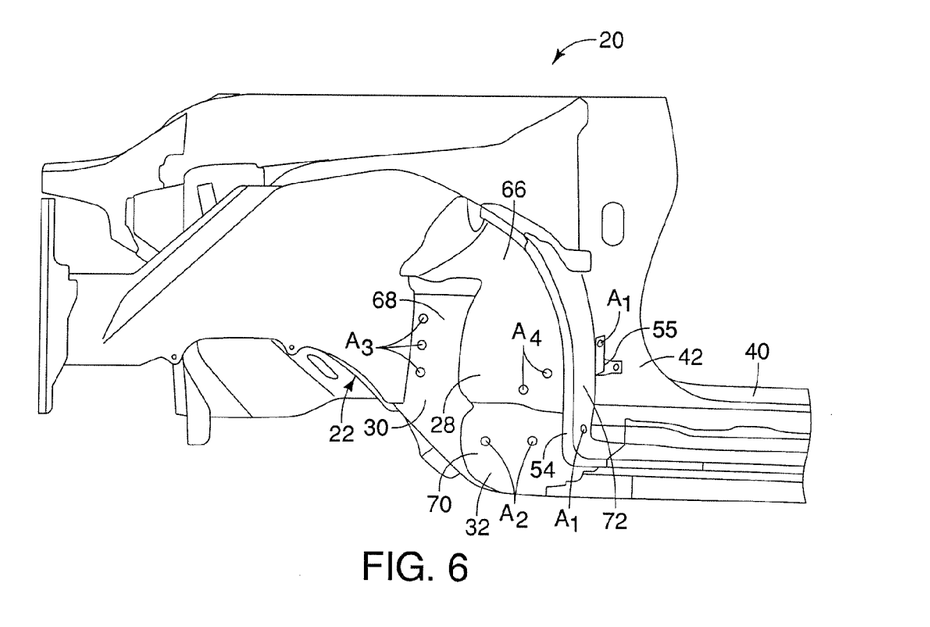
FIG. 6 is a perspective view of the front portion of the vehicle body structure showing another view of the elements that at least partially define the wheel well with the reinforcing bracket and the wheel well cover removed in accordance with the one embodiment.
Figure 7:
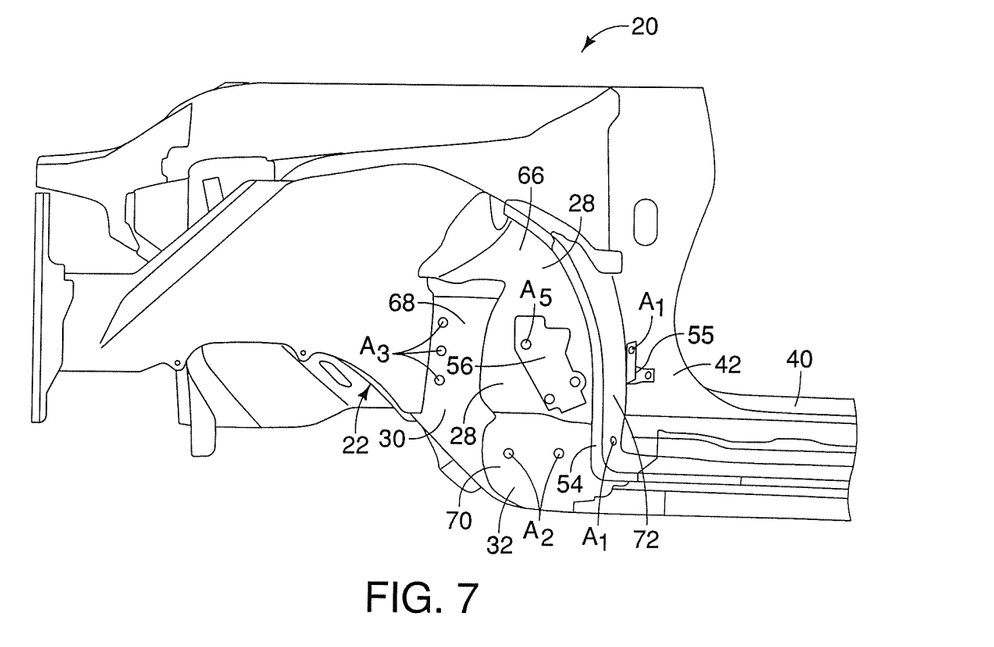
FIG. 7 is another perspective view of the front portion of the vehicle body structure similar to FIG. 6 showing an intermediate bracket installed to the dash wall of the vehicle body structure within the wheel well in accordance with the one embodiment.

The dash wall 28 is a portion of the vehicle body structure 20 that separates an engine compartment of the vehicle 10 from the passenger compartment 24. The dash wall 28 also separates the wheel well 22 from the passenger compartment 24. The dash wall 28 can be one single panel or can be an assembly that includes a plurality of separate panels welded together. As shown in FIG. 4, at least a portion of the dash wall 28 extends laterally between the A-pillar support portion 42 and the front structural support portion 30. As shown in FIGS. 5 and 6, at least a portion of the dash wall 28 extends vertically upward from the lateral structural support portion 32. Specifically, a lower portion of the dash wall 28 is welded to one or both of the floor 34 and the lateral structural support portion 32. Further, one side of the dash wall 28 is welded to the A-pillar support portion 42 of the side sill 40 and another portion of the dash wall 28 is welded to the front structural support portion 30. The dash wall 28 is provided with an offset bracket 56 that includes three threaded apertures, as is described in greater detail below.

There are two of the front structural support portions 30. The front structural support portions 30 are mirror images of each other but otherwise identical. Description of one of the front structural support portions 30 is provided below for the sake of brevity, but applies equally to both of the front structural support portions 30. The front structural support portion 30 is an assembly made of a plurality of panels welded together. Basically, the front structural support portion 30 is a beam that extends in a longitudinal direction of the vehicle 10. Although not shown or described, the front structural support portion 30 includes a conventional front bumper assembly support section (not shown), a conventional engine support section (not shown) and a conventional suspension and/or strut support section. Since these features are conventional in nature, further description is omitted for the sake of brevity.

The front structural support portion 30 defines an inner wall of the wheel well 22. The front structural support portion 30 extends from a front of the vehicle 10 to at least a point under the floor 34. The front structural support portion 30 can extend rearward to a rear section of the vehicle 10 or can transition below the floor 34 into other structural elements that complement the structural rigidity of the front structural support portion 30 and the floor 34.

The lateral structural support portions 32 are mirror images of each other but otherwise identical. Description of one of the lateral structural support portions 32 is provided below for the sake of brevity, but applies equally to both of the lateral structural support portions 32. The lateral structural support portion 32 is shown as a unitary component but can be an assembly made of a plurality of panels welded together. Basically, the lateral structural support portion 32 is a beam that extends in a lateral direction of the vehicle 10. Specifically, the lateral structural support portion 32 extends from the side sill 40 to the front structural support portion 30. The lateral structural support portion 32 is often referred to as a torque box (or outrigger) in that it provides lateral structural rigidity to the vehicle body structure 20 to counteract the stress generated by torque from the engine (not shown) to the vehicle 10 during operation of the vehicle 10. It should be understood that the lateral structural support portions 32 can be two separate assemblies or can be a single assembly that extends from side to side of the vehicle body structure 20. In the depicted embodiment, there are two separate lateral structural support portions 32, one on each side of the vehicle body structure 20 extending between respective ones of the side sill 40 and the front structural support portion 30.

The floor 34 can be single panel or can be an assembly of various panels that make up the floor 34. The floor 34 extends laterally between the side sills 40 of the side body panels 26 and extends rearward from the lateral support portions 32 and the dash wall 28 toward the rear of the vehicle body structure 20 at least partially defining the passenger compartment 24. Specifically, front end sections of the floor 34 are welded to the lateral support portions 32 and the dash wall 28 in a conventional manner.

As shown in FIGS. 2, 3 and 13-14, the floor 34 also includes stiffener panels 60 that align with corresponding portions of the front structural support portions 30 extending below the floor 34. There are two stiffener panels 60 located on either side of a centrally located tunnel section 62. The stiffener panels 60 and the tunnel section 62 extend in a longitudinal vehicle direction from front to rear of the passenger compartment 24. The stiffener panels 60 and the tunnel section 62 are supplemental floor panels, welded to the upper surface of the floor 34 thereby providing structural rigidity to the floor in a conventional manner.

As indicated in FIGS. 4-6, the wheel well 22 is at least partially defined by the dash wall 28, the front structural support portion 30, the lateral structural support portion 32, and the A-pillar support portion 42 of the side sill 40. As is shown in FIG. 6, a forward facing surface 72 of the A-pillar support portion 42 of the side sill 40 outboard from the seam 54 includes an aperture $A_1$. Similarly, the fender attachment bracket 55 includes another aperture $A_1$, the fender attachment bracket 55 being welded or otherwise rigidly fixed to the A-pillar support portion 42. A front surface 70 of the lateral structural support portion 32 below the dash wall 28 includes a pair of apertures $A_2$. A side surface 68 of the front structural support portion 30 extending in a vehicle longitudinal direction includes a plurality of apertures $A_3$. A front surface 66 of the dash wall 28 includes a pair of apertures $A_4$. Further, the offset bracket 56 includes an aperture $A_5$.

As shown in FIG. 4, the side surface 68 of the front structural support portion 30 extends in a direction generally perpendicular to the forward facing surface 72 of the A-pillar support portion 42 of the side sill 40. The front surface 66 of the dash wall 28 and the front surface 70 of the lateral structural support portion 32 are angularly offset from the side surface 68 and the forward facing surface 72 by angles that are greater than 90 degrees (obtuse angles).

Figure 9:
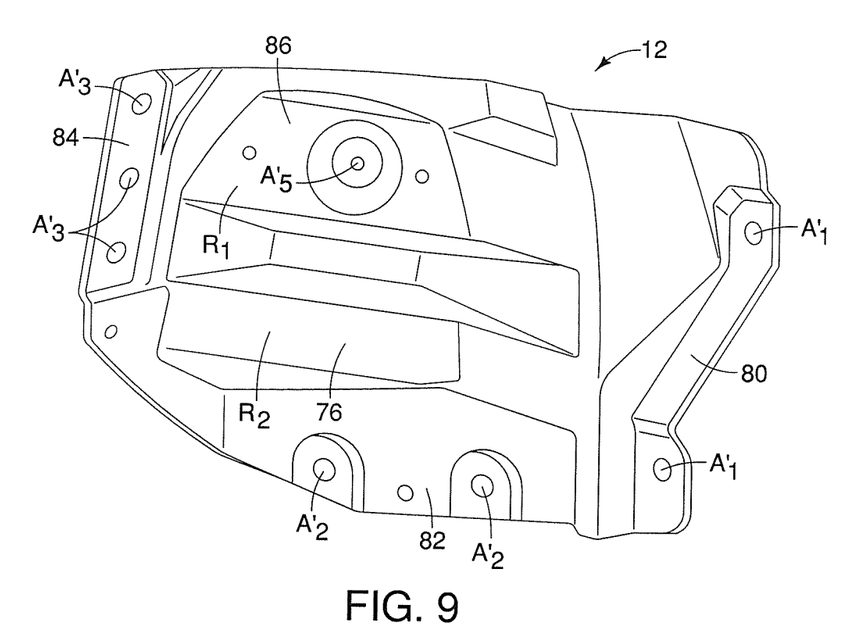
FIG. 9 is a perspective view of a forward facing surface of the reinforcing bracket with the reinforcing bracket removed from the vehicle in accordance with the one embodiment.
Figure 10:
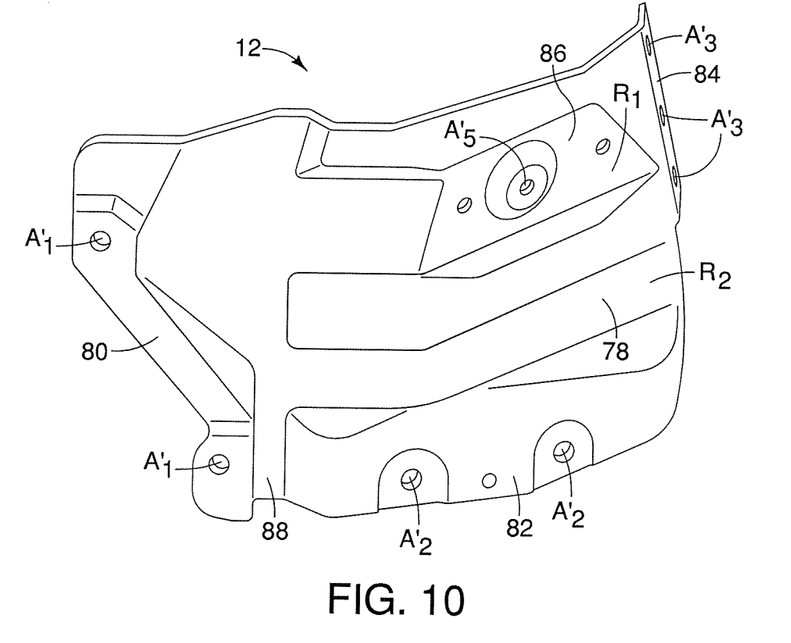
FIG. 10 is a perspective view of a rearward facing surface of the reinforcing bracket with the reinforcing bracket removed from the vehicle in accordance with the one embodiment.
Figure 11:
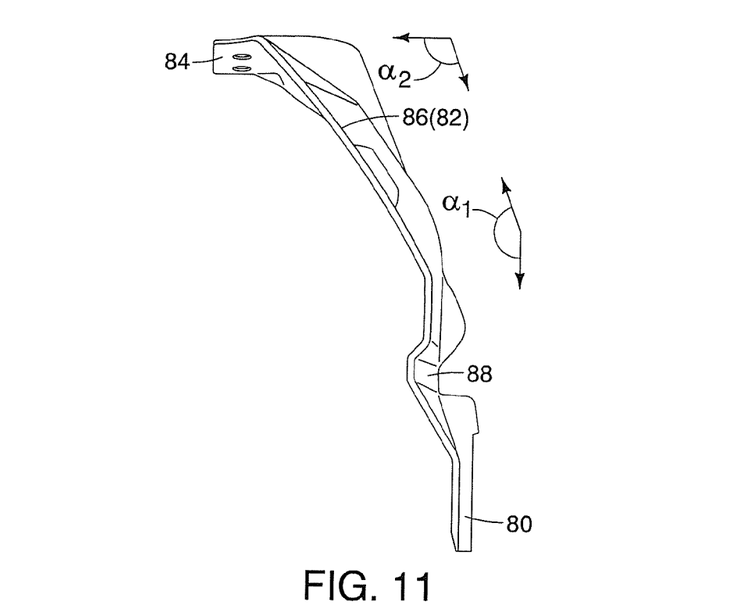
FIG. 11 is a top view of the reinforcing bracket with the reinforcing bracket removed from the vehicle in accordance with the one embodiment.

A description of the outer reinforcing bracket 12 is now provided with specific reference to FIGS. 9-11. The outer reinforcing bracket 12 basically includes a wheel well facing surface 76 and a dash wall facing surface 78. The wheel well facing surface 76 overall is a concave surface and the dash wall facing surface 78 is an overall convex surface. The outer reinforcing bracket 12 is further divided into several flange sections hereinafter referred to as a first surface section 80, a second surface section 82, a third surface section 84 and a fourth surface section 86. The outer reinforcing bracket 12 also includes a vertically extending recess 88. As shown in FIGS. 9 and 10, the first surface section 80 includes apertures $A_1^1$, the second surface section 82 includes apertures $A_2'$, the third surface section 84 includes apertures $A_3'$ and the fourth surface section 86 includes an aperture $A_5'$.

The first surface section 80 defines a first location for attachment of the outer reinforcing bracket 12 to the vehicle body structure 20. Specifically, fasteners $F_1$ extending through apertures $A_1'$ in the first surface section 80 attach the outer reinforcing bracket 12 to the A-pillar support portion 42 at the aperture $A_1$ and the fender attachment bracket 55 outboard relative to the seam 54 at the aperture $A_1$. The second surface section 82 defines a second location for attachment of the outer reinforcing bracket 12 to the vehicle body structure 20. Specifically, fasteners $F_2$ extending through apertures $A_2'$ in the second surface section 82 attach the outer reinforcing bracket 12 to the lateral structural support portion 32 via the apertures $A_2$. The third surface section 84 defines a third location for attachment of the outer reinforcing bracket 12 to the vehicle body structure 20. Specifically, fasteners $F_3$ extending through apertures $A_3'$ in the third surface section 84 attach the outer reinforcing bracket 12 to the front structural support portion 30 via the apertures $A_3$. Further, the fourth surface section 86 defines a fourth location for attachment of the outer reinforcing bracket 12 to the vehicle body structure 20. Specifically, a fastener $F_5$ (shown in FIG. 4) extending through aperture $A_5'$ in the fourth surface section 86 attaches the outer reinforcing bracket 12 to the offset bracket 56 via the aperture $A_5$. As described below, the offset bracket 56 is attached to the inner reinforcing bracket 14 via fasteners $F_4$ that extend through the apertures $A_4$ in the dash wall 28. The various fasteners depicted can be any of a variety of fasteners, such as threaded fasteners, or rivets. Since fasteners are conventional elements, further description of fasteners is omitted for the sake of brevity.

Consequently, the outer reinforcing bracket 12 is attached to four different structural elements of the vehicle body structure 20. Specifically, the outer reinforcing bracket 12 is attached to the dash wall 26 (via the offset bracket 56), the front structural support portion 30, the lateral structural support portion 32 and the A-pillar support portion 42 of the side sill 40. Since the outer reinforcing bracket 12 is attached to the A-pillar support portion 42 of the side sill 40 at a location outboard of the seam 54, the outer reinforcing bracket 12 extends across an overlap connection (the seam 54) between the dash wall 28 and the A-pillar support portion 42. Further, the overlap connection (the seam 54) extends part way into the vertically extending recess 88 of the outer reinforcing bracket 12.

As is shown in FIG. 11, the first surface section 80 and the second surface section 82 are angularly offset from one another by a first obtuse angle $\alpha_1$. The third surface section 84 and the second surface section 82 are angularly offset from one another by a second obtuse angle $\alpha_2$. Further, the first surface section 80 is perpendicular to the third surface section 84. In the depicted embodiment, the first obtuse angle $\alpha_1$ is greater than the second obtuse angle $\alpha_2$. The first obtuse angle $\alpha_1$ is between 140 and 150 degrees and the second obtuse angle $\alpha_2$ is between 120 and 130 degrees.

Figure 12:
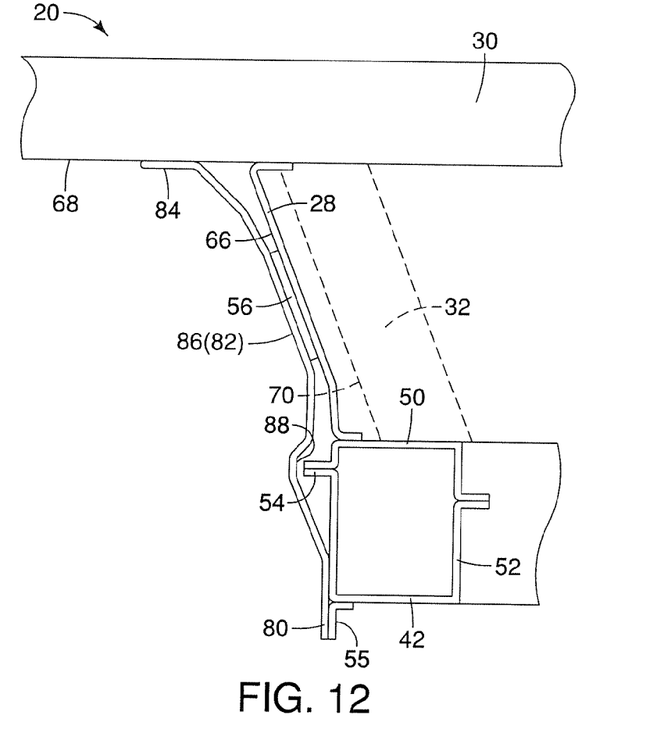
FIG. 12 is a top schematic view showing the reinforcing bracket installed to the dash wall, the A-pillar support portion of the side sill, the lateral support structure and the front structural support portion in accordance with the one embodiment.
Figure 16:
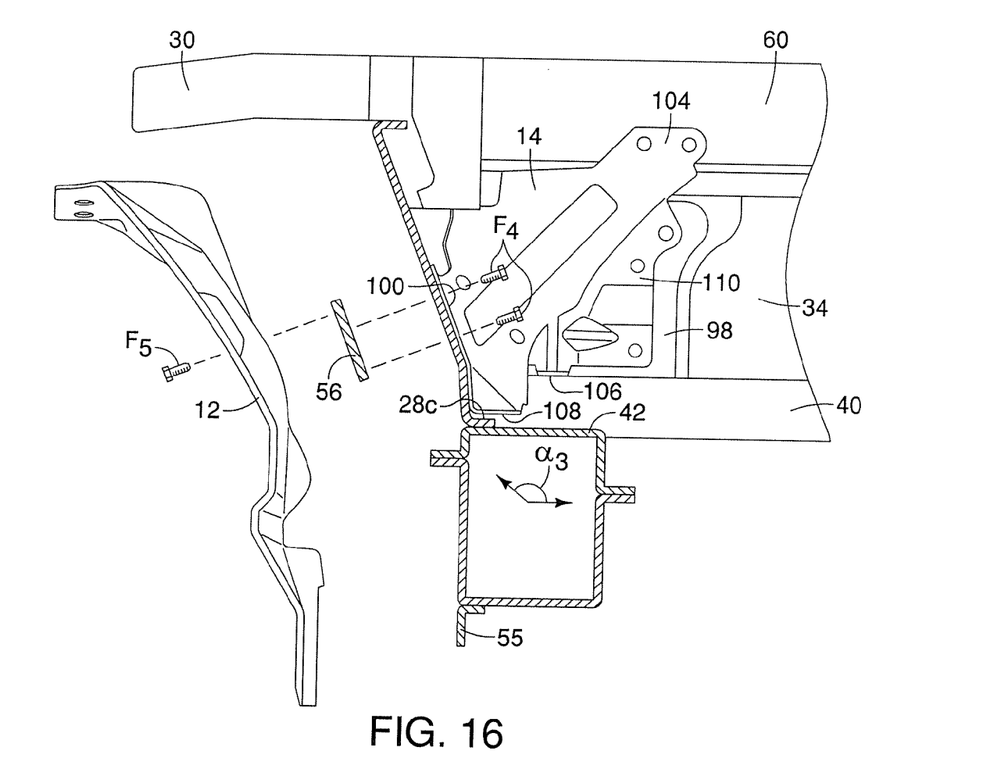
FIG. 16 is a top exploded cross-sectional view similar to FIG. 4, showing the A-pillar support portion of the side sill, the dash wall and the front structural support portion, with the offset bracket installed to the inner reinforcing bracket and the dash wall, and the reinforcing bracket installed to the offset bracket in accordance with the one embodiment.
Figure 17:
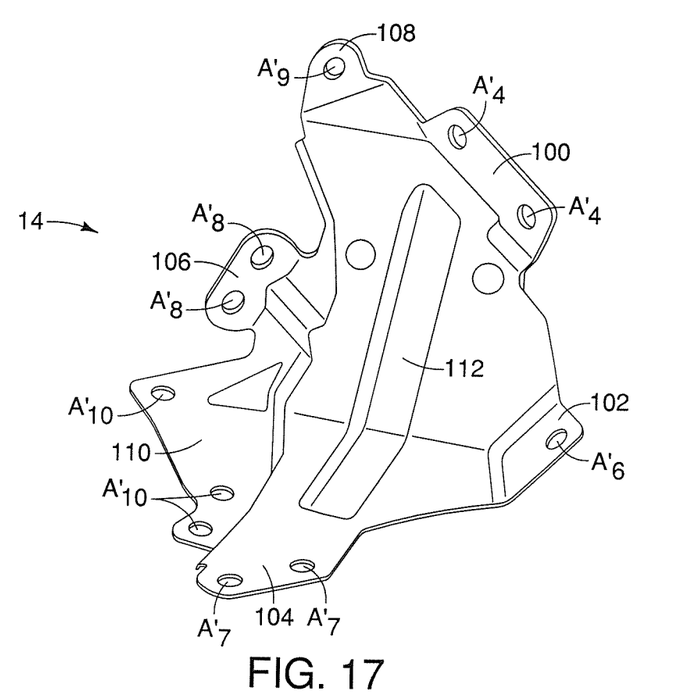
FIG. 17 is a perspective view of the inner reinforcing bracket removed from the vehicle showing an upper surface and various flange portions in accordance with the one embodiment.

FIGS. 5-8 show a sequence for attachment of the outer reinforcing bracket 12 to the vehicle body structure 20. As shown in FIG. 6, the apertures $A_1$ through $A_4$ are provided for receiving fasteners $F_1$ through $F_4$. Alternatively, the apertures $A_1$ through $A_4$ and the offset bracket 56 can be omitted and the outer reinforcing bracket 12 can be welded in position. As indicated in FIG. 16, the offset bracket 56 is installed to the dash wall 28. The offset bracket 56 is attached to the dash wall 28 via fasteners $F_4$ that extend from the passenger compartment side of the dash wall 28, through the apertures $A_4$, and out into threaded apertures in the offset bracket 56. It should be understood from the drawings and the description herein that the inner reinforcing bracket 14 can be installed at this time. However, the inner reinforcing bracket 14 is not required for use with the outer reinforcing bracket 12. Specifically, the outer reinforcing bracket 12 can be installed to the vehicle body structure 20 in the absence of the inner reinforcing bracket 14. For example, in FIG. 12, the inner reinforcing bracket 14 is optionally omitted.

Figure 8:
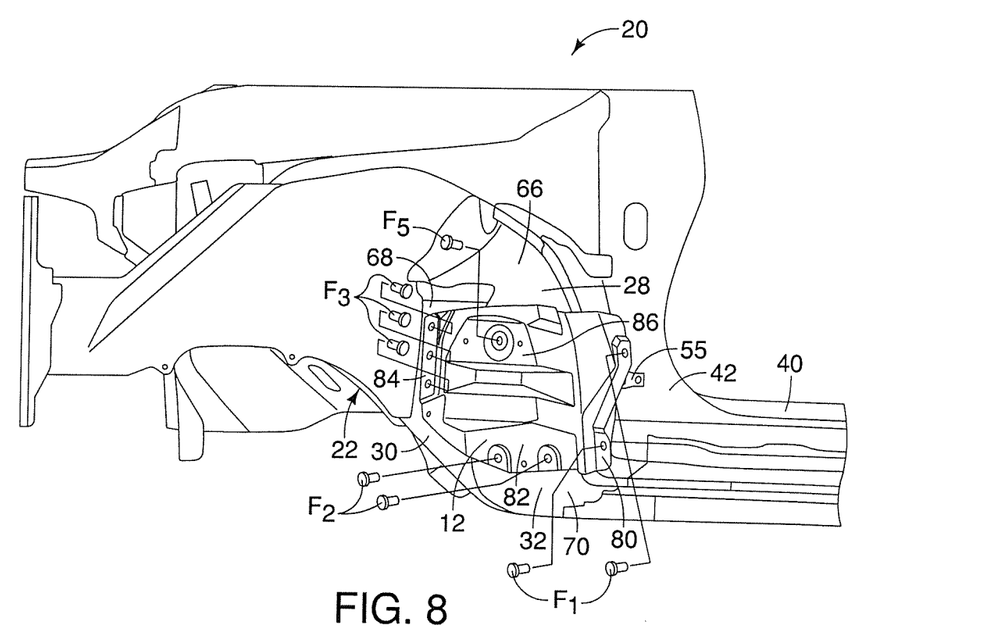
FIG. 8 is another perspective view of the front portion of the vehicle body structure similar to FIGS. 6 and 7 showing the reinforcing bracket installed to the dash wall, the lateral support structure, the front structural support portion and the A-pillar support portion of the side sill within the wheel well in accordance with the one embodiment.

As indicated in FIG. 8, the outer reinforcing bracket 12 is then positioned such that fasteners $F_1$ through $F_3$ and $F_5$ can be installed in the apertures $A_1$ through $A_3$ and $A_5$. The first through fourth surface sections 80-86 are provided with apertures that align with the apertures $A_1$ thru $A_3$ and $A_5$.

It should be understood from the drawings and the description herein that the outer reinforcing bracket 12 can alternatively be welded in position, thereby eliminating the need for mechanical fasteners. Hence, the various apertures described herein below can alternatively be considered to be welding points.

Finally, as indicated in FIGS. 4 and 5, a conventional wheel well liner 90 is installed, covering the outer reinforcing bracket 12. The wheel well liner 90 can attach to the outer reinforcing bracket 12 and other various components of the vehicle body structure 20 via snap-fit clips or other fastening means.

As is indicated in FIGS. 9 and 10, the outer reinforcing bracket 12 includes a plurality of horizontally extending ribs $R_1$ and $R_2$. The ribs $R_1$ and $R_2$ add rigidity to the outer reinforcing bracket 12.

In an off-center frontal impact event, where a side fender 92 and/or the wheel well 22 of the vehicle 10 is the approximate central point of impact, impacting forces are distributed by the outer reinforcing bracket 12 to the dash wall 26, the front structural support portion 30, the lateral structural support portion 32 and the A-pillar support portion 42 of the side sill 40.

A description of the inner reinforcing bracket 14 and related structures of the passenger compartment 24 is now provided with specific reference to FIGS. 13-21.

As mentioned above and shown in FIG. 13, the passenger compartment 24 is at least partially defined by the dash wall 28, the floor 34, the side sill 40 and the A-pillar support section 42 of the side body panels 26. The floor 34 includes the above mentioned stiffener panel 60. The stiffener panel 60 defines a floor stiffener that is fixedly attached to the upper surface of the floor 34 by, for example, welding. The stiffener panel 60 extends from proximate the dash wall 28 rearward within the passenger compartment 24. An upper surface of the stiffener panel 60 is spaced apart from and above the upper surface of the floor 34.

The floor 34 also includes a floor bracket 98 that is fixedly attached to the upper surface of the floor 34 and a side surface of stiffener panel 60 (the floor stiffener). Specifically, the floor bracket 98 is welded and/or fastened by mechanical fasteners to the floor 34 such that the floor bracket 98 extends a transverse vehicle direction from the inboard surface of the side sill 40 to the side surface of the stiffener panel 60.

Figure 13:
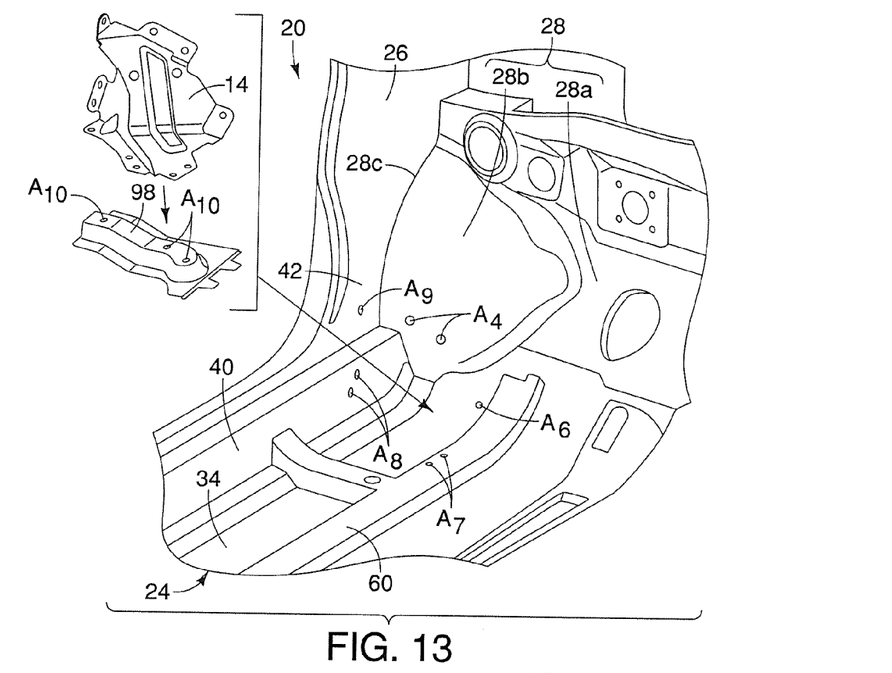
FIG. 13 is an exploded perspective view of a lower area of a passenger compartment of the vehicle body structure showing the passenger compartment floor, the dash wall, the side sill, one of the inner reinforcing brackets and a lateral bracket that is installed to the passenger compartment floor in accordance with the one embodiment.
Figure 14:
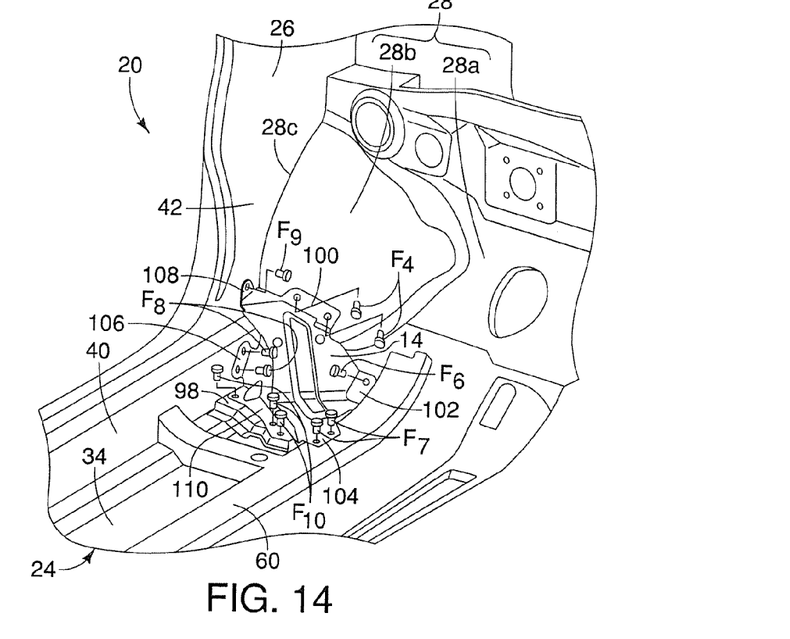
FIG. 14 is another perspective view of the lower area of the passenger compartment of the vehicle body structure similar to FIG. 13 showing the inner reinforcing bracket installed to the lateral bracket, the passenger compartment floor, the dash wall and the side sill in accordance with the one embodiment.
Figure 15:
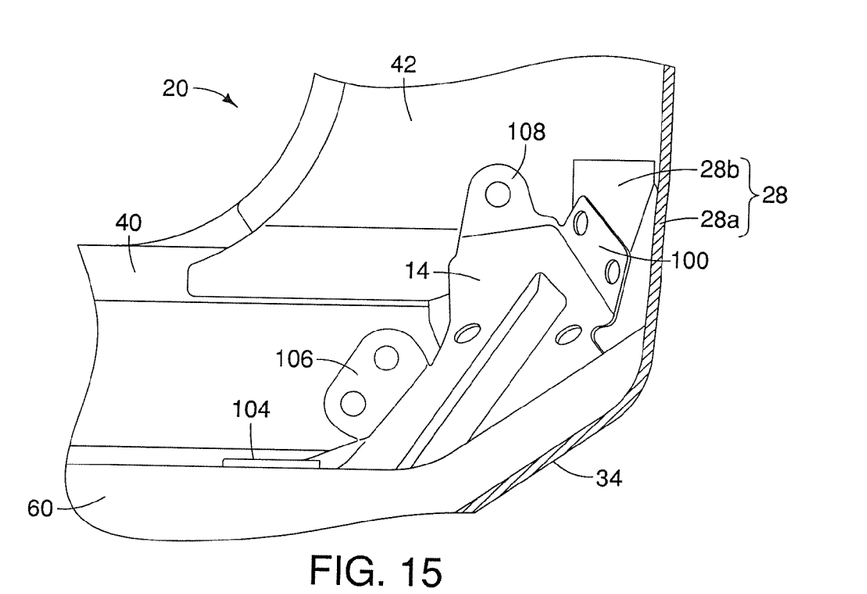
FIG. 15 is a cut-away side view of the lower area of the passenger compartment of the vehicle body structure showing the inner reinforcing bracket installed to the dash wall and the side sill in accordance with the one embodiment.

As indicated in FIGS. 13 and 14, the interior surface of the dash wall 28 includes a flat section 28a and a convex section 28b. As shown in FIG. 16, the convex section 28b includes an outboard edge 28c fixedly attached to the A-pillar support portion 42 by, for example, welding.

The inner reinforcing bracket 14 is fastened in position in the depicted embodiment by mechanical fasteners $F_4$, and $F_6$ through $F_{10}$. However, as with the outer reinforcing bracket 12, the inner reinforcing bracket 14 can alternatively be welded in position. The various apertures described herein below can alternatively be considered to be welding points.

As shown in FIG. 13, the dash wall 28 includes the previously described apertures $A_4$. The floor 34 includes an aperture $A_6$ (which can optionally coincide with an aperture formed in an attachment flange of the stiffener panel 60), the stiffener panel 60 includes apertures $A_7$, the side sill 40 includes apertures $A_8$ and the A-pillar support section 42 includes an aperture $A_9$. Further, the floor bracket 98 includes apertures $A_{10}$.

As shown in FIGS. 17-20, the inner reinforcing bracket 14 includes a plurality of flange sections that are offset from one another defining a number of positional and angular relationships. Specifically, the inner reinforcing bracket 14 includes a dash wall attachment section 100, a first floor attachment section 102, a second floor attachment section 104, a sill attachment section 106, an A-pillar attachment section 108 and a floor bracket attachment section 110. The inner reinforcing bracket 14 also includes a stiffening rib 112 that extends diagonally from below the dash wall attachment section 100 to a point adjacent to the second floor attachment section 104.

The dash wall attachment section 100 includes a pair of apertures $A_4'$ that align with the apertures $A_4$ in the dash wall 28 with the inner reinforcing bracket 14 in the installed position depicted in FIG. 14. The first floor attachment section 102 includes an aperture $A_6'$ that aligns with the aperture $A_6$ in the floor 34 with the inner reinforcing bracket 14 in the installed position depicted in FIG. 14. The second floor attachment section 104 includes a pair of apertures $A_7'$ that align with the apertures $A_7$ in the stiffener panel 60 with the inner reinforcing bracket 14 in the installed position depicted in FIG. 14. The sill attachment section 106 includes a pair of apertures $A_8'$ that align with the apertures $A_8$ in the side sill 40 with the inner reinforcing bracket 14 in the installed position depicted in FIG. 14. The A-pillar attachment section 108 includes an aperture $A_9'$ that aligns with the aperture $A_9$ in the A-pillar support portion 42 with the inner reinforcing bracket 14 in the installed position depicted in FIG. 14. Further, the floor bracket attachment section 110 includes three apertures $A_{10}'$ that align with the apertures $A_{10}$ in the floor bracket 98 with the inner reinforcing bracket 14 in the installed position depicted in FIG. 14.

More specifically, the dash wall attachment section 100 attaches to the dash wall 28 with fasteners $F_4$ extending through the apertures $A_4'$ and the apertures $A_4$, the first floor attachment section 102 attaches to a forward section of the floor 34 with fastener $F_6$ extending through the aperture $A_6'$ and the aperture $A_6$, the second floor attachment section 104 attaches to the stiffener panel 60 of the floor 34 with fasteners $F_7$ extending through the apertures $A_7'$ and the apertures $A_7$, the sill attachment section 106 attaches to the side sill 40 with fasteners $F_8$ extending through the apertures $A_8'$ and the apertures $A_8$, the A-pillar attachment section 108 attaches to the A-pillar support portion 42 with fastener $F_9$ extending through the aperture $A_9'$ and the apertures $A_9$ and the floor bracket attachment section 110 attaches to the floor bracket 98 with fasteners $F_{10}$ extending through the apertures $A_{10}'$ and the apertures $A_{10}$. The second floor attachment section 104 and the floor bracket attachment section 110 basically define a rear attachment section that faces and is attached to an upper surface of the floor 34 and floor bracket 98, respectively.

Figure 18:
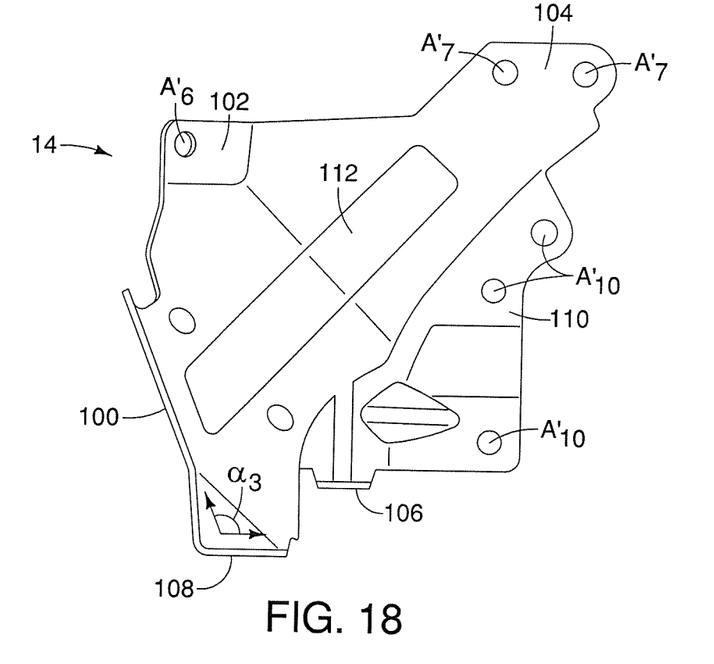
FIG. 18 is a top view of the inner reinforcing bracket shown removed from the vehicle in accordance with the one embodiment.
Figure 19:
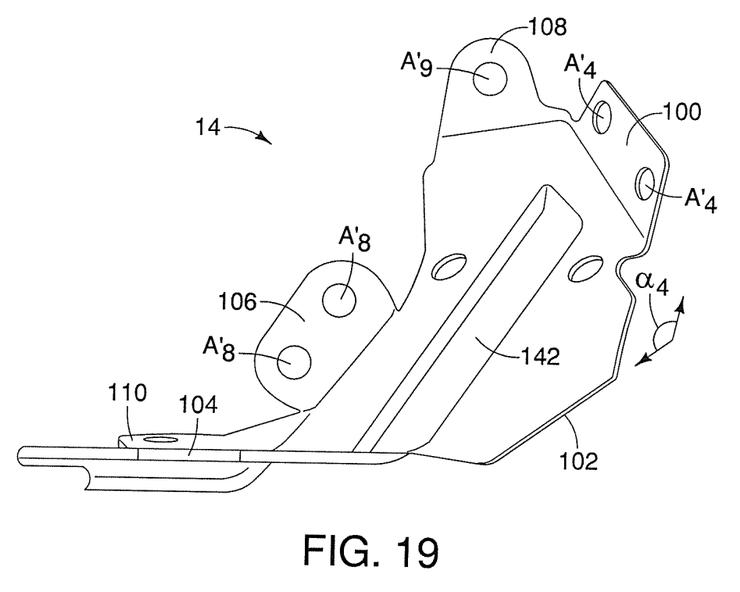
FIG. 19 is a side view of the inner reinforcing bracket shown removed from the vehicle in accordance with the one embodiment.
Figure 20:
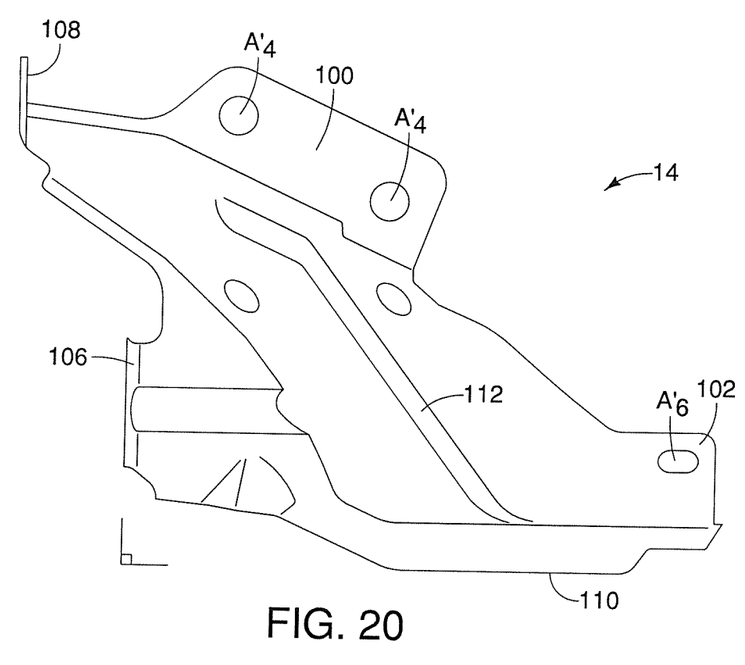
FIG. 20 is a rear view of the inner reinforcing bracket shown removed from the vehicle in accordance with the one embodiment.

As indicated in FIGS. 16 and 18, the sill attachment section 106 and the A-pillar attachment section 108 are parallel to one another. Further, the sill attachment section 106 is angularly offset from the dash wall attachment section 100 by an obtuse angle $\alpha_3$. Further, as indicated in FIG. 19, the dash wall attachment section 100 is angularly offset from the first floor attachment section 102 by an obtuse angle $\alpha_4$. Further, as shown in FIG. 20, the sill attachment section 106 and the A-pillar attachment section 108 are both perpendicular to the floor bracket attachment section 110. Further, the floor bracket attachment section 110 is parallel the second floor attachment section 104.

The inner reinforcing bracket 14 is therefore attached to the dash wall 28, the side sill 40, the A-pillar support portion 42 and the floor 34. More specifically, the inner reinforcing bracket 14 is attached to or fixedly coupled to the floor 34 via the stiffener panel 60 and the floor bracket 98.

Figure 21:
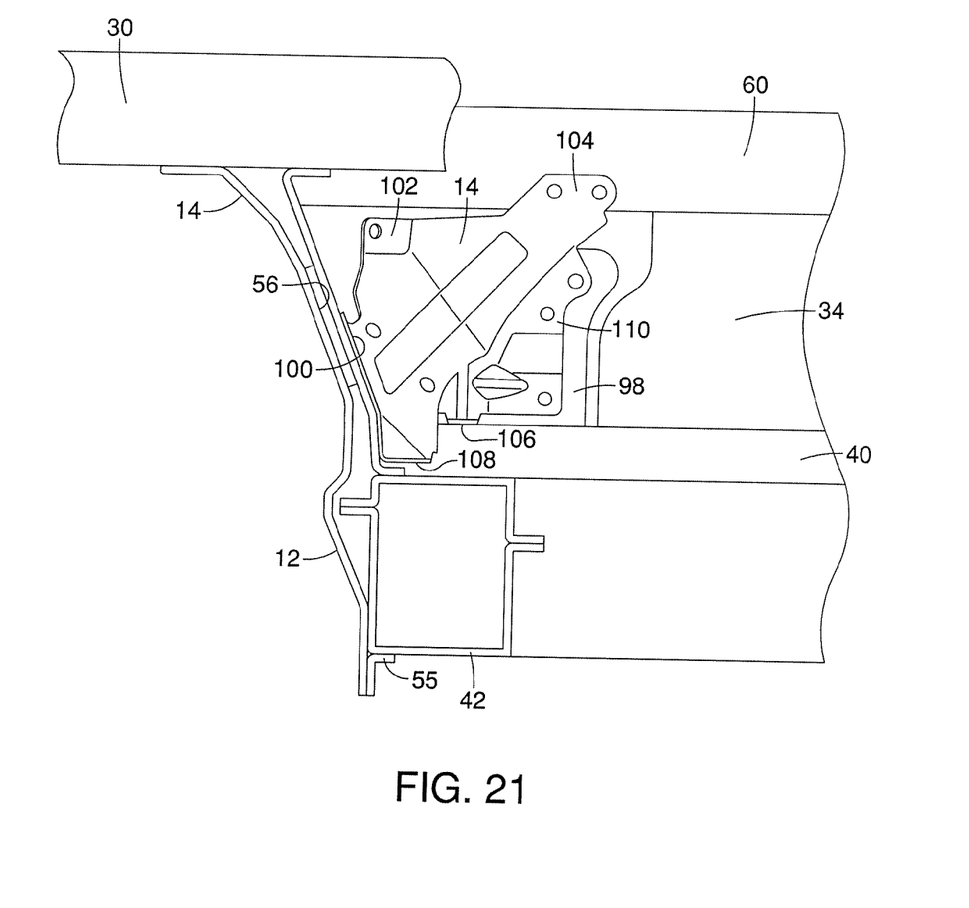
FIG. 21 is a schematic top view of the vehicle body structure similar to FIG. 12 showing the reinforcing bracket installed to the A-pillar support portion of the side sill, the dash wall via the offset bracket and the front structural support portion, and further showing the inner reinforcing bracket installed to the side sill, the dash wall, the offset bracket and the passenger compartment floor in accordance with the one embodiment.

As shown schematically in FIG. 21, the outer reinforcing bracket 12 and the inner reinforcing bracket 14 are shaped and configured to work together to reinforce specific sections of the vehicle body structure 20 relative to both the wheel well 22 and the passenger compartment 24. It should be understood from the drawings and description herein that the inner and outer reinforcing brackets 12 and 14 can be used together. However, alternatively, the outer reinforcing bracket 12 can be used alone or the inner reinforcing bracket 14 can be used alone.

In several of the drawings, the mechanical fasteners $F_1$ through $F_{10}$ have intentionally been omitted in order to more clearly show the relationships between the various parts of the outer reinforcing bracket 12 and the inner reinforcing bracket 14 and their relationships with related structures. However, it should also be understood that the outer reinforcing bracket 12 and the inner reinforcing bracket 14 can alternatively be welded in position, thereby eliminating the need for mechanical fasteners.

In an off-center frontal impact event, where a side fender 92 and/or the wheel well 22 of the vehicle 10 is the approximate central point of impact, impacting forces are distributed by the inner reinforcing bracket 14 to the dash wall 26, the floor 34, the A-pillar support portion 42 and the side sill 40.

Many of the various elements and features of the vehicle 10 are conventional components that are well known in the art. Since these elements and features are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle front body structure. Accordingly, these terms, as utilized to describe the present invention should be interpreted relative to a vehicle equipped with the vehicle front body structure.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle front body structure comprising:
    an A-pillar support portion;
    a dash wall attached to the A-pillar support portion and at least partially defining a wheel well;
    a front structural support portion extending in a vehicle longitudinal direction from the dash wall;
    a lateral structural support portion extending from the front structural support to the A-pillar support portion along a lower portion of the dash wall; and
    a reinforcing bracket attached at a first location to the A-pillar support portion, attached at a second location to the lateral structural support portion, attached at a third location to the front structural support portion and attached at a fourth location to the dash wall, the reinforcing bracket extending across an overlap connection between the dash wall and the A-pillar support portion.

2. The vehicle front body structure according to claim 1, wherein
    the reinforcing bracket includes a first surface section at the first location and a second surface section at the second location, the first surface section being angularly offset from the second surface section by a first obtuse angle.

3. The vehicle front body structure according to claim 2, wherein
    the reinforcing bracket includes a third surface section at the third location, the second surface section being angularly offset from the third surface section by a second obtuse angle.

4. The vehicle front body structure according to claim 3, wherein
    the first surface section is perpendicular to the third surface section.

5. The vehicle front body structure according to claim 3, wherein
    the first obtuse angle is greater than the second obtuse angle.

6. The vehicle front body structure according to claim 3, wherein
    the first obtuse angle is between 140 and 150 degrees.

7. The vehicle front body structure according to claim 6, wherein
    the second obtuse angle is between 120 and 130 degrees.

8. The vehicle front body structure according to claim 1, wherein
    the first surface section is perpendicular to the third surface section.

9. The vehicle front body structure according to claim 1, further comprising
    an offset bracket attaches the dash wall to the reinforcing bracket.

10. The vehicle front body structure according to claim 9, further comprising an interior reinforcing bracket fixed to the offset bracket on a side of the dash wall opposite the reinforcing bracket.

11. The vehicle front body structure according to claim 1, further comprising
a fender attachment bracket attached to the A-pillar support portion at the first location with the reinforcing bracket being attached directly to the A-pillar support portion by a first fastener and directly to the fender attachment bracket by a second fastener.

12. The vehicle front body structure according to claim 11, wherein
the A-pillar support portion includes a side sill, the first fastener coupling to the A-pillar support portion at the side sill and the second fastener being located above the first fastener.

13. The vehicle front body structure according to claim 1, wherein
the A-pillar support portion includes a plurality of panels welded together defining at least a vertically extending beam.

14. The vehicle front body structure according to claim 1, wherein
the front structural support portion includes a plurality of panels welded together defining a horizontally extending beam.

15. The vehicle front body structure according to claim 1, wherein
the lateral structural support portion includes a horizontally extending beam.

16. The vehicle front body structure according to claim 1, wherein
the reinforcing bracket includes a horizontally extending rib.

17. The vehicle front body structure according to claim 1, wherein
the reinforcing bracket includes a plurality of horizontally extending ribs.

18. The vehicle front body structure according to claim 1, wherein
the reinforcing bracket includes a first surface facing the dash wall and a second surface that faces away from the dash wall, the second surface being concave.

19. The vehicle front body structure according to claim 18, wherein
the first surface of the reinforcing bracket includes a vertically extending recess with at least a portion of the overlap connection extending into the recess.

20. The vehicle front body structure according to claim 1, wherein
the reinforcing bracket includes a vertically extending recess with at least a portion of the overlap connection extending into the recess.

* * * * *